United States Patent
Eraiah et al.

(10) Patent No.: US 11,431,549 B2
(45) Date of Patent: Aug. 30, 2022

(54) SYSTEM AND METHOD OF INFORMATION HANDLING SYSTEM ALERT HANDLING

(71) Applicant: Dell Products L.P., Round Rock, TX (US)

(72) Inventors: Ramesha Hachagodanahally Eraiah, Bangalore (IN); Muniswamy Setty KS, Bangalore (IN); Rishi Mukherjee, Bangalore (IN); Smruti Ranjan Debata, Bangalore (IN); Prasad Yadav DA, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/015,305

(22) Filed: Sep. 9, 2020

(65) Prior Publication Data
US 2022/0078070 A1    Mar. 10, 2022

(51) Int. Cl.
*G06F 11/00* (2006.01)
*H04L 41/06* (2022.01)
*G06F 11/07* (2006.01)

(52) U.S. Cl.
CPC .......... *H04L 41/06* (2013.01); *G06F 11/0709* (2013.01); *G06F 11/0751* (2013.01); *G06F 11/0766* (2013.01); *G06F 11/0769* (2013.01)

(58) Field of Classification Search
CPC ............. G06F 11/0709; G06F 11/0751; G06F 11/0769; G06F 11/0706; G06F 11/0766; G06F 11/0784
See application file for complete search history.

(56) References Cited

PUBLICATIONS

SupportAssist Enterprise Version 4.0, May 15, 2020, https://downloads.dell.com/manuals/all-products/esuprt_software_int/esuprt_software_serviceability_tools/supportassist-enterprise-v40_reference-guide4_en-us.pdf, Version 4.0, 14 pages (Year: 2020).*
Account lockout threshold, Nov. 2, 2018, https://docs.microsoft.com/en-us/windows/security/threat-protection/security-policy-settings/account-lockout-threshold, 7 pages (Year: 2018).*
Dell EMC SupportAssist Enterprise 2.x—Guide and Download, Retrieved from url: https://www.dell.com/support/article/en-us/sln299049/dell-emc-supportassist-enterprise-2-x-guide-and-download?lang=en, Retrieved on Aug. 11, 2020.
SupportAssist Enterprise Version 4.0.5—User's Guide, Dell EMC, Jul. 2020.

* cited by examiner

*Primary Examiner* — Katherine Lin
(74) *Attorney, Agent, or Firm* — Baker Botts, L.L.P.

(57) ABSTRACT

In one or more embodiments, one or more systems, one or more methods, and/or one or more processes may: receive, via a network, multiple discovery messages respectively from multiple information handling systems (IHSs); receive, via the network, a first message associated with a first event from a first information handling system of the multiple IHSs; determine, based at least on the first message, that none of multiple rules is associated with the first event; in response to determining that none of the multiple rules is associated with the first event, provide a second message associated with the first event to a back end information handling system (IHS); receive, from the back end IHS, data indicating how to handle the first event; add, to the multiple rules, a rule based at least on the data indicating how to handle the first event; and provide the rule to the multiple IHSs.

14 Claims, 4 Drawing Sheets

SYSTEM AND METHOD OF INFORMATION HANDLING SYSTEM ALERT HANDLING

BACKGROUND

Field of the Disclosure

This disclosure relates generally to information handling systems and more particularly to information handling system alert handling.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive, via a network, multiple discovery messages respectively from multiple information handling systems; may update an inventory based at least on the multiple discovery messages; may determine a first alert associated with a first event; may receive, via the network, a first message associated with the first event from the first information handling system; may determine, based at least on the first message, that none of multiple rules is associated with the first event; may provide a second message associated with the first event to a back end information handling system; may receive, from the back end information handling system, data indicating how to handle the first event; may add, to the multiple rules, a rule based at least on the data indicating how to handle the first event; may provide the rule to the multiple information handling systems; may determine a second alert associated with a second event; may determine that the second event matches the rule; and may handle the second event based at least on the rule, without assistance from the management information handling system.

In one or more embodiments, the one or more systems, the one or more methods, and/or the one or more processes may further receive the second message associated with the first event and may further raise a case associated with the first event. For example, raising the case associated with the first event may be performed in response to receiving the second message associated with the first event. In one or more embodiments, the first alert is associated with a failure of a component of the first information handling system. For example, the component includes a power supply, a fan, or a non-volatile memory medium, among others. In one or more embodiments, the one or more systems, the one or more methods, and/or the one or more processes may further determine that a third event does not match the rule and may further provide a third message associated with the third event to the back end information handling system. In one or more embodiments, adding, to the multiple rules, the rule based at least on the data indicating how to handle may include updating a rules engine.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
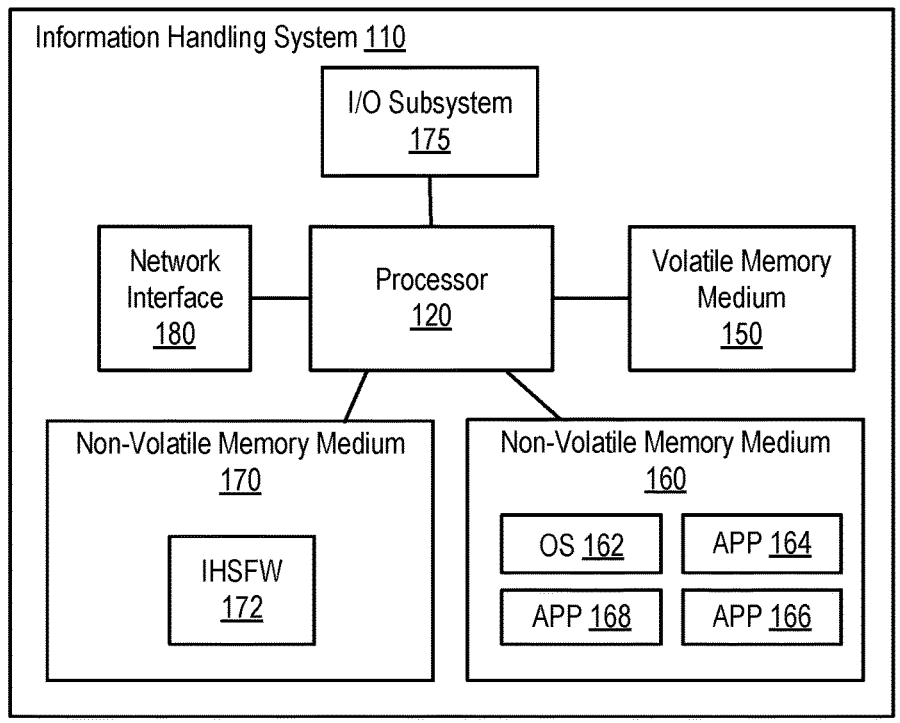
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, technical support for information handling systems, storage devices, and/or network devices may be automated. For example, an event may occur on an information handling system, a storage device, or a network device. For instance, the information handling system, the storage device, or the network device may provide a message, based at least on the event, to an information handling system manager. For example, the message may include alert information. The information handling system manager may receive the message. The information handling system manager may provide the message to an enterprise manager. In one or more embodiments, the enterprise manager may determine a case based at least on the message. The case may include a process based at least on the message. The process may include eligibility for raising the case for technical assistance.

In one or more embodiments, the enterprise manager may utilize a policy filter on the message. The policy filter may include rules. The rules may characterize an alert of the message. For example, characterizing the alert may initiate a case. In one or more embodiments, a relationship between or among information handling system components of similar types that triggered an alert may be determined. For example, as the enterprise manager receives additional messages, additional relationships may be determined.

In one or more embodiments, a rules engine may work together with the policy filter to determine responses to potential cases. For example, the responses to the potential cases may be determined various similar information handling system components of the multiple information handling systems. After the responses to the potential cases have been determined, the rules engine may replicate the policy filter on the multiple information handling systems. In one or more embodiments, the information handling system manager may maintain a rules engine that may determine if an alert qualifies for a case. For example, the rules engine may utilize a policy filter to determine if an alert qualifies for a case.

In one or more embodiments, the enterprise manager may utilize a diagnostic engine. For example, the diagnostic engine may utilize one or more evidence files to determine one or more parts that match an information handling system with a faulty component. In one or more embodiments, the policy filter of the information handling system manager may be updated and/or enhanced with information associated with the one or more parts that match the information handling system with the faulty component.

In one or more embodiments, the rules engine, in conjunction with inventory information of the information handling systems and the policy filter, may be operable to determine potential information handling systems that may emit similar alerts. In one or more embodiments, the information handling system manager may provide the policy filter to the information handling systems. For example, the information handling system manager may provide the policy filter to the information handling systems via an information handling system controller application programming interface (API).

In one or more embodiments, individual information handling systems may be configured with the policy filter. For example, utilizing the policy filter, the information handling systems may be operable to determine responses to one or more alerts without communicating with the information handling system manager. In one or more embodiments, the rules engine in conjunction the policy filter may enable an information handling system in handling potential alerts for case creation without delegating processing logic to another system.

In one or more embodiments, one or more systems, one or more methods, and/or one or more processes may delegate case creation to an individual information handling system level. As information handling system events are generated, information from logs may be utilized to determine case creation by other information handling systems. For example, replaying a sequence of component and/or information handling system behavior may be utilized to determine case creation by other information handling systems. This may permit multiple information handling systems with a single an information handling system manager to scale to greater numbers of information handling systems as case creation may be operable to implement and/or manage case creation and/or log collection. In one or more embodiments, a rules engine and/or a policy filter may be modified based at least on new alerts and/or based at least on new events associated with information handling systems. The rules engine and/or the policy filter may be utilized by other information handling systems to determine one or more responses to alerts and/or to events.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, nonvolatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 1B:
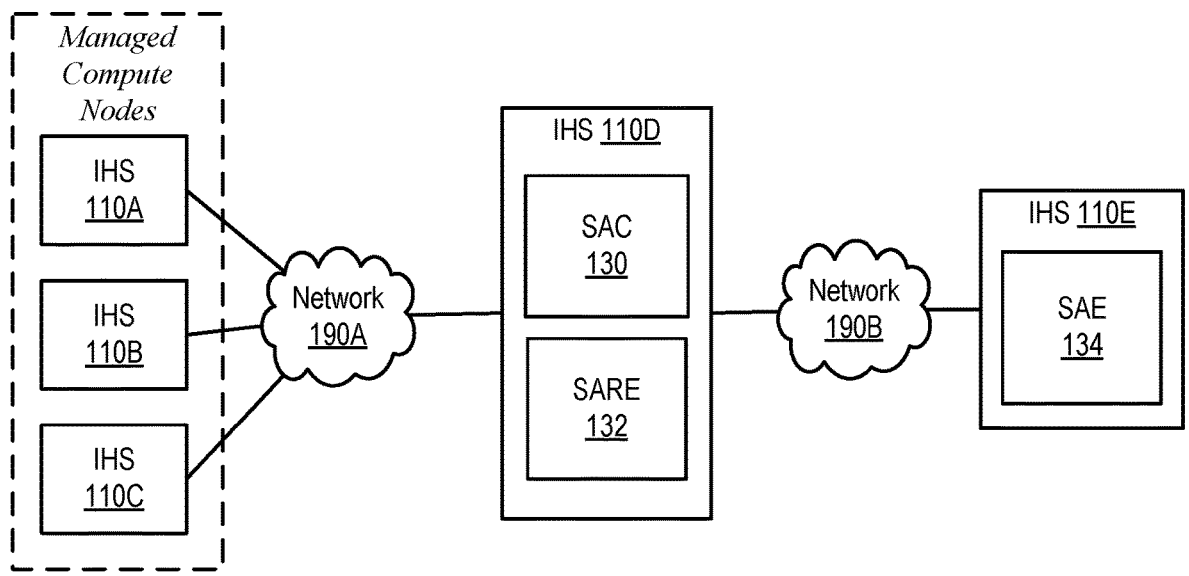
FIG. 1B illustrates an example of multiple information handling systems and multiple networks, according to one or more embodiments.

Turning now to FIG. 1B, an example of multiple information handling systems and multiple networks is illustrated, according to one or more embodiments. As shown, information handling systems (IHSs) 110A-110C may be coupled to a network 190A. In one or more embodiments, IHSs 110A-110C may be managed compute nodes. For example, a managed compute node may include an IHS 110 that is managed by another IHS 110. For instance, IHSs 110A-110C may managed by an IHS 110D. In one or more embodiments, managing one or more of IHSs 110A-110C may include remotely managing the one or more of IHSs 110A-110C. For example, remotely managing the one or more of IHSs 110A-110C may include one or more of remote system administration of the one or more of IHSs 110A-110C, remote software installation to the one or more of IHSs 110A-110C, remote software updates to the one or more of IHSs 110A-110C, remotely applying one or more software patches to the one or more of IHSs 110A-110C, remotely applying one or more security patches to the one or more of IHSs 110A-110C, remotely configuring the one or more IHSs 110A-110C, and remote storing log information from the one or more of IHSs 110A-110C, among others.

In one or more embodiments, a network 190 may include a wired network, a wireless network, an optical network, or a combination of the foregoing, among others. For example, network 190 may include and/or be coupled to various types of communications networks. For instance, network 190 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others.

As illustrated, IHS 110D may be coupled to network 190A. In one or more embodiments, IHS 110D may manage IHSs 110A-110C. For example, IHS 110D may remotely manage IHSs 110A-110C via network 190A. Although three managed compute nodes IHSs 110A-110C are illustrated, any number of IHSs 110 may be managed compute nodes, according to one or more embodiments. As shown, IHS 110D may include a SupportAssist Core (SAC) 130. As illustrated, IHS 110D may include a SupportAssist Rules Engine (SARE) 132. In one or more embodiments, SAC 130 and/or SARE 132 may include data and/or processor instructions, which when utilized by and/or executed by a processor 120 of an IHS 110, may implement at least a portion of one or more systems, at least a portion of one or more flowcharts, at least a portion of one or more methods, and/or at least a portion of one or more processes described herein. In one example, one or more of memory media 150, 160, and 170 of IHS 110D, among others, may include SAC 130. In another example, one or more of memory media 150, 160, and 170 of IHS 110D, among others, may include SARE 132.

As shown, IHS 110D may be coupled to a network 190B. As illustrated, an IHS 110E may be coupled to network 190B. As shown, IHS 110E may include a SupportAssist Enterprise (SAE) 134. In one or more embodiments, SAE 134 may include data and/or processor instructions, which when utilized by and/or executed by a processor 120 of an IHS 110, may implement at least a portion of one or more systems, at least a portion of one or more flowcharts, at least a portion of one or more methods, and/or at least a portion of one or more processes described herein.

In one or more embodiments, SAE 134 may configure managed compute nodes (e.g., IHSs 1110A-1110C). SAE 134 may include an application that may automate technical support for one or more managed compute nodes, one or more storage devices, and/or one or more networking devices, among others. For example, SAE 134 may monitor the one or more managed compute nodes, the one or more storage devices, and/or the one or more networking devices and may detect hardware issues that may occur. For instance, SAE 134 may open a support case when a hardware issue is detected. In one or more embodiments, SAE 134 may collect state information associated with the hardware issue. For example, the state information may be utilized to troubleshoot the hardware issue.

In one or more embodiments, SAC 130 may receive an alert when a hardware event occurs on a managed compute node. In one or more embodiments, the alert may be filtered. For example, filtering an alert may include utilizing one or more policies to determine if the alert qualifies for creating a support case or to determine if the alert qualifies for updating an existing support case. After the support case is created or updated, SAC 130 may collect system information from the managed compute node and may send the system information to a backend server (e.g., IHS 110E). For example, technical support may utilize the system information to troubleshoot the issue and provide an appropriate solution. For instance, the technical support may include one or more people and/or one or more information handling systems, among others. In one or more embodiments, a managed compute node may send the system information to the backend server when an alert is generated.

In one or more embodiments, system information from the managed compute node may include a system information log. In one example, the system information log may include a hardware and/or software inventory (e.g., installed information handling system components, processors, memory, network device(s), usage, service tag information, etc.). In a second example, the system information log may include a software configuration (e.g., an operating system, installed applications, etc.). In a third example, the system information log may include configuration information (e.g., interfaces information, virtual local area network information, data center bridging information, spanning tree information, stacking information, etc.). In a fourth example, the system information log may include identity information (e.g., system name information, domain name information, and Internet protocol address information). In another example, the system information log may include event data (e.g., Windows event logs, a core dump, a debug log, etc.).

In one or more embodiments, SAC 130 may maintain SARE 132. For example, SARE 132 may determine if an alert qualifies for a dispatch. For instance, determining if an alert qualifies for a dispatch may include utilizing a policy filter to determine if the alert qualifies for the dispatch. In one or more embodiments, a rule may be utilized in characterizing an alert, which may lead to a case. A rule may additionally build a relation between information handling system components of similar types that have caused the alert. For example, as additional information handling system components and new alerts occur, rules may build additional relations between the additional information handling system components of similar types that have caused the alerts. In one or more embodiments, the backend server may utilize an online diagnostic engine that may utilize collected system information from the managed compute nodes to determine information handling system components which match alerts. For example, SAC 130 may enhance the policy filter with information associated with information handling system components that correspond to the alerts. In one or more embodiments, the policy filter may be provided to the managed nodes. For example, a managed node may utilize the policy filter to determine a course of action associated with an alert. For instance, a managed node, utilizing the policy filter, may handle an alert without assistance from SAC 130. In one or more embodiments, a system may include one or more of IHSs 110A-110E and/or one or more of networks 190A and 190B, among others.

Figure 2A:
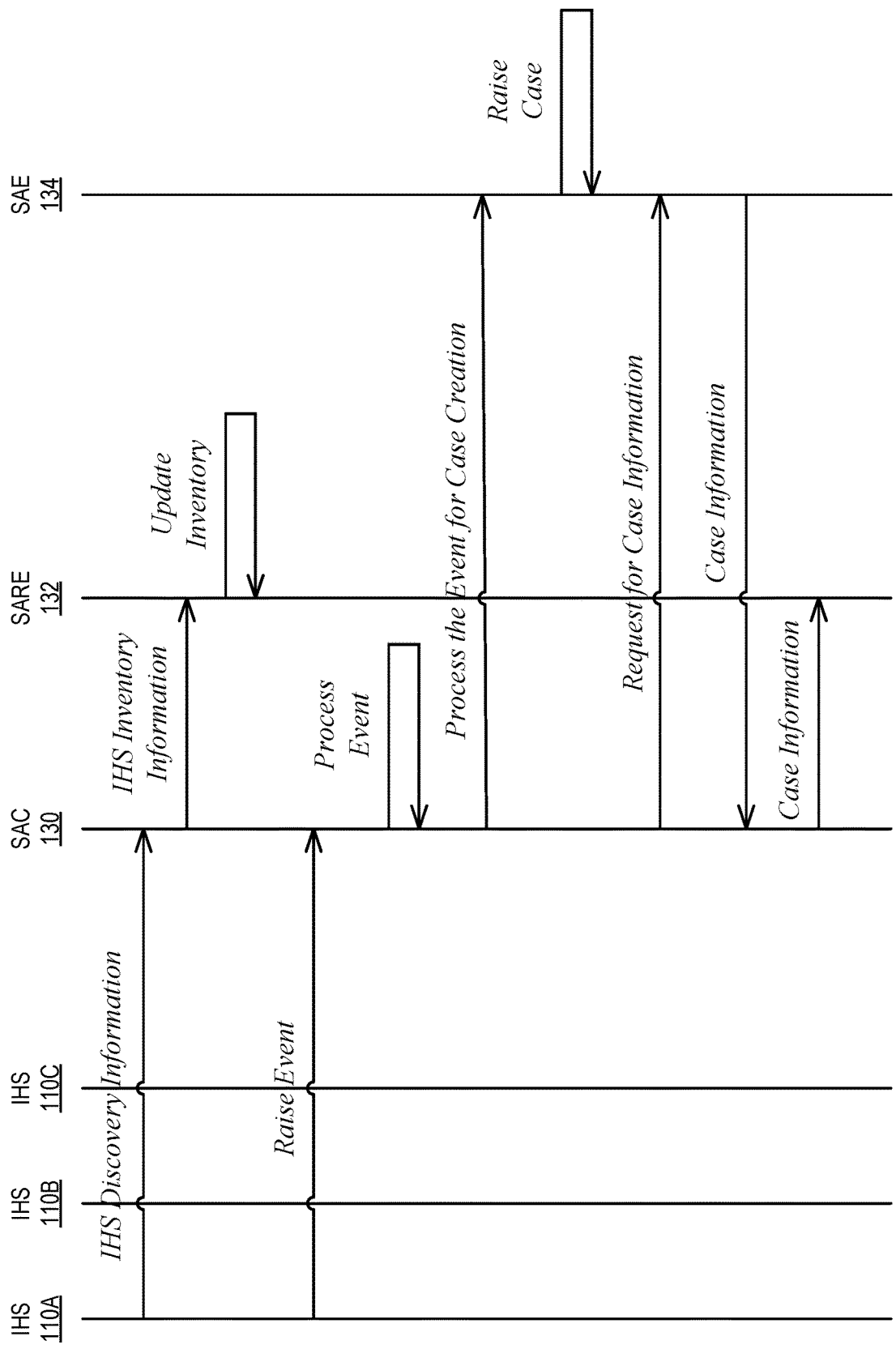
FIGS. 2A and 2B illustrate an example of a sequence diagram of operating multiple information handling systems, according to one or more embodiments.
Figure 2B:
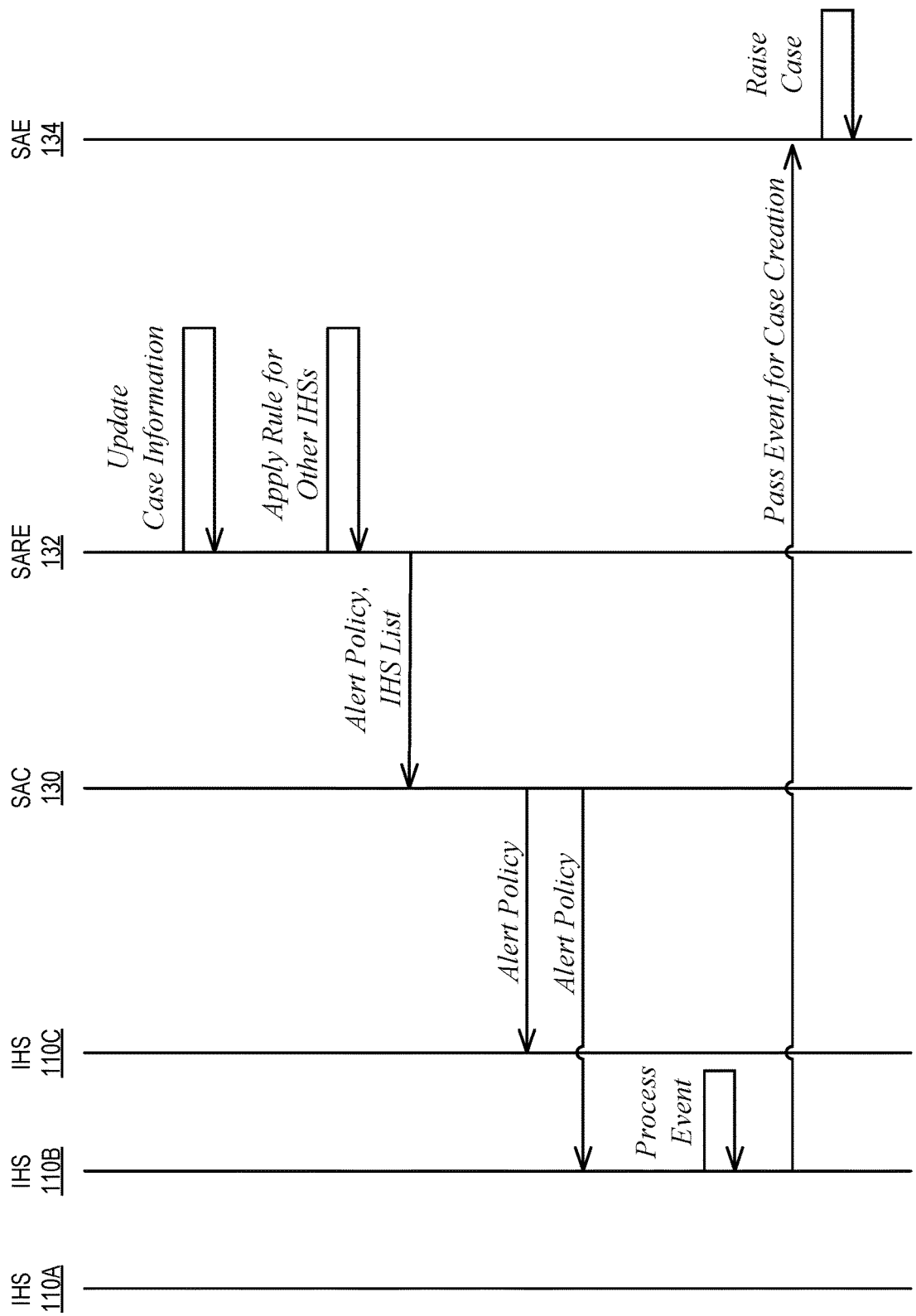

Turning now to FIGS. 2A and 2B, an example of a sequence diagram of operating multiple information handling systems is illustrated, according to one or more embodiments. As shown, IHS 110A may provide IHS discovery information to SAC 130. For example, SAC 130 may receive the IHS discovery information. As illustrated, SAC 130 may provide IHS inventory information to SARE 132. For example, SAC 130 may provide IHS inventory information to SARE 132 in response to receiving the IHS discovery information from IHS 110A. As shown, SARE 132 may update an inventory. For example, SARE 132 may update an inventory with information associated with IHS 110A.

As illustrated, IHS 110A may raise an event to SAC 130. In one or more embodiments, an event may include a failure of software, firmware, or a component of a managed compute node. In one example, an event may include a power supply failure of a managed compute node. In a second example, an event may include a fan failure of a managed compute node. In another example, an event may include a non-volatile memory medium (e.g., a hard drive, a SSD, etc.) failure of a managed compute node.

As shown, SAC 130 may process the event. As illustrated, SAC 130 may process the event for case creation. For example, SAC 130 may process the event and provide information associated with the event to SAE 134. For instance, the information associated with the event may include log information up to the time of the event. As illustrated, SAE 134 may raise a case. For example, raising a case may include creating a case associated with the event raised by IHS 110A. As shown, SAC 130 may request case information from SAE 134. As illustrated, SAE 134 may provide the case information to SAC 130. As shown, SAC 130 may provide the case information to SARE 132.

As illustrated, SARE 132 may update the case information. As shown, SARE 132 may apply a rule for other IHSs. For example, SARE 132 may apply a rule for other IHSs (e.g., IHSs 110B and 110C) based at least on the case information. In one or more embodiments, SARE 132 may determine, based at least on the inventory of managed compute nodes, if one or more of the other IHSs may raise the event that IHS 110A raised. If the one or more of the other IHSs may raise the event that IHS 110A raised, SARE 132 may create an alert policy, based at least on the event, and/or may create an IHS list based at least on the one or more of the other IHSs may raise the event that IHS 110A raised. As illustrated, SARE 132 may provide the alert policy to SAC 130. As shown, SARE 132 may provide the IHS list to SAC 130.

In one or more embodiments, SAC 130 may provide the alert policy to each IHS of the IHS list. For example, the IHS list may include IHSs 110B and 110C. As illustrated, SAC 130 may provide the alert policy to IHSs 110B and 110C. In one or more embodiments, after the alert policy is received, if the event raised by IHS 110A is raised by one or more of IHSs 110B and 110C, the one or more of IHSs 110B and 110C may manage the event based at least on the alert policy.

As shown, IHS 110B may process the event. For example, IHS 110B may process the event based at least on the alert policy. In one or more embodiments, the alert policy may include information that instructs the managed compute node to pass the event for case creation to SAE 134. As illustrated, IHS 110B may pass the event for case creation to SAE 134. As shown, SAE 134 may raise a case. For example, SAE 134 may raise a case based at least on the event from IHS 110B.

Figure 3:
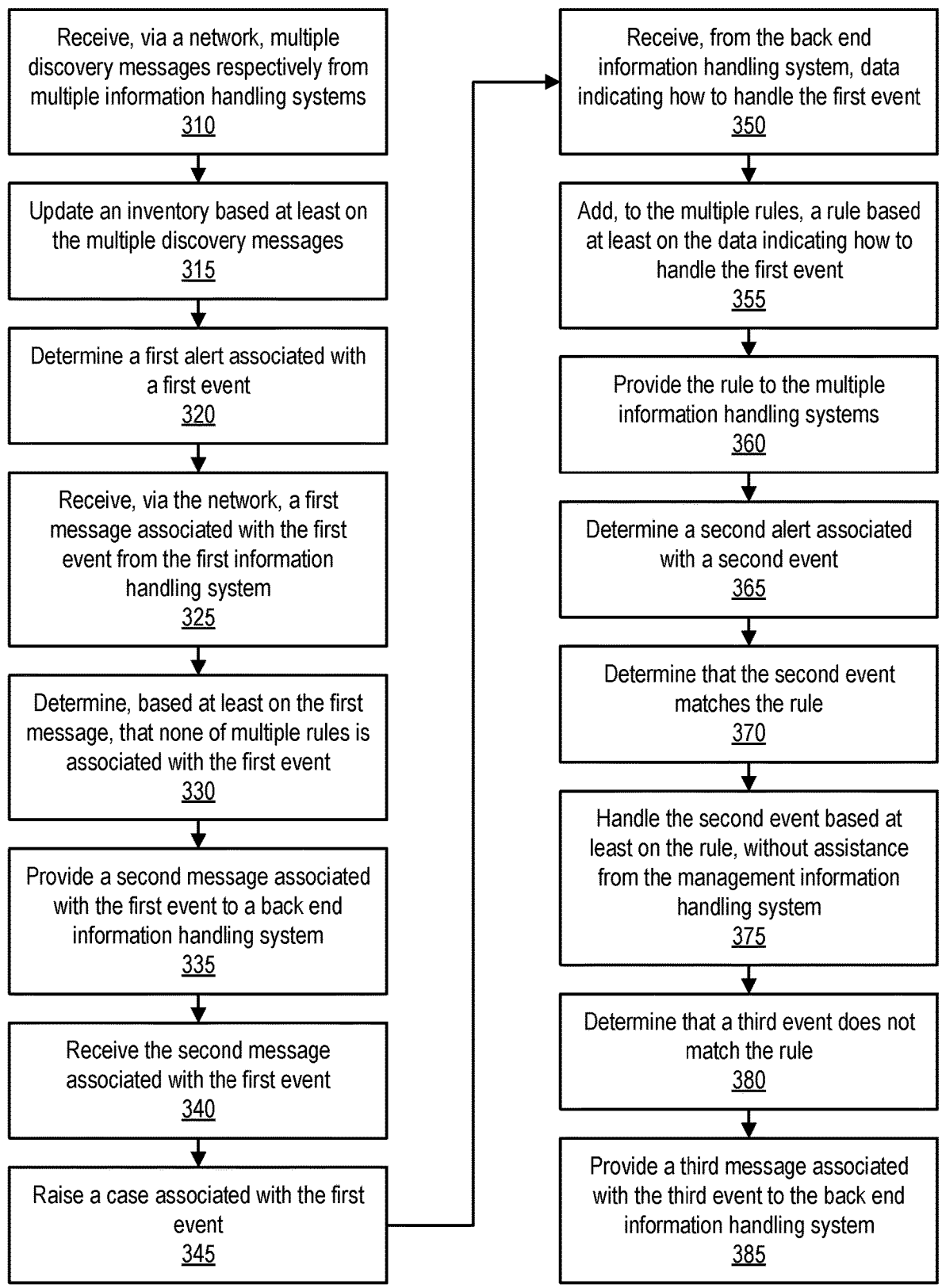
FIG. 3 illustrates a method of operating a system, according to one or more embodiments.

Turning now to FIG. 3, a method of operating a system is illustrated, according to one or more embodiments. At 310, multiple discovery messages may be received respectively from multiple information handling systems via a first network. For example, IHS 110D may receive multiple discovery messages from IHSs 110A-110C via network 190A. At 315, an inventory may be updated based at least on the multiple discovery messages. For example, IHS 110D may update an inventory based at least on the multiple discovery messages.

At 320, a first alert associated with a first event may be determined. For example, a first information handling system of the multiple information handling systems may determine a first alert associated with a first event. For instance, IHS 110A may determine a first alert associated with a first event. In one or more embodiments, the first alert may be associated with a failure of a component of the first information handling system. For example, the component of the first information handling system may include a power supply, a fan, or a non-volatile memory medium, among others. In one or more embodiments, the first alert may be associated with a first alert identification. For example, the first alert identification may include one or more alphanumeric characters.

At 325, a first message associated with the first event from the first information handling system may be received via the first network. For example, IHS 110D may receive a first message associated with the first event from IHS 110A via network 190A. In one or more embodiments, the first message may include first information associated with the first alert. For example, the first information may include the first alert. At 330, it may be determined, based at least on the first message, that none of multiple rules is associated with the first event. For example, IHS 110D may determine, based at least on the first message, that none of multiple rules is associated with the first event.

At 335, a second message associated with the first event may be provided to a back end information handling system. For example, IHS 110D may provide a second message associated with the first event to IHS 110E via network 190B. In one or more embodiments, providing the second message associated with the first event to the back end information handling system may be performed in response to determining that none of the multiple rules is associated with the first event. In one or more embodiments, the second message may include second information associated with the first alert. For example, the second information may include the first alert.

At 340, the second message associated with the first event may be received. For example, the back end information handling system may receive the second message associated with the first event. For instance, IHS 110E may receive the second message associated with the first event via network 190B. At 345, a case associated with the first event may be raised. For example, the back end information handling system may raise a case associated with the first event. For instance, IHS 110E may raise a case associated with the first event. In one or more embodiments, raising the case associated with the first event may be performed in response to receiving the second message associated with the first event.

At 350, data indicating how to handle the first event may be received from the back end information handling system. For example, IHS 110D may receive, via network 190B, data indicating how to handle the first event from IHS 110E. In one or more embodiments, the data indicating how to handle the first event may include one or more courses of actions to take by an information handling system. For example, the one or more courses of actions to take by the information handling system may include one or more instructions that may be performed by the information handling system.

At 355, a rule based at least on the data indicating how to handle the first event may be added to the multiple rules. For example, IHS 110D may add, to the multiple rules, a rule based at least on the data indicating how to handle the first event. In one instance, SARE 132 may add, to the multiple rules, a rule based at least on the data indicating how to handle the first event. In another instance, SARE 132 may be updated with a rule based at least on the data indicating how to handle the first event.

At 360, the rule may be provided to the multiple information handling systems. For example, IHS 110D may provide the rule to IHSs 110A-110C. In one or more embodiments, IHS 110D may provide the rule to one or more information handling systems other than IHS 110A. For example, IHS 110D may provide the rule to one or more of IHSs 110B and 110C, among others. At 365, it may be determined that a second alert associated with a second event. For example, IHS 110B may determine a second alert associated with a second event. In one or more embodiments, the second alert may be associated with a second alert identification. For example, the second alert identification may include one or more alphanumeric characters. In one or more embodiments, the second alert identification may match the first identification. For example, IHS 110B may determine that the second alert identification matches the first identification.

At 370, it may be determined that a second event matches the rule. For example, IHS 110B may determine that a second event matches the rule. In one or more embodiments, the rule may be associated the first alert identification. For example, the rule may include the first alert identification. In one or more embodiments, determining that the second event matches the rule may include determining that the second alert identification matches the first alert identification, which is associated with the rule. At 375, the second event may be handled based at least on the rule, without assistance from the management information handling system. For example, IHS 110B may handle the second event based at least on the rule, without assistance from IHS 110D. In one or more embodiments, IHS 110B may handle the second event based at least on the rule without assistance from any other IHS 110.

At 380, it may be determined that a third event does not match the rule. For example, IHS 110B may determine that a third event does not match the rule. At 385, a third message associated with the third event to the back end information handling system. For example, IHS 110B may provide a third message associated with the third event to the back end information handling system. For instance, IHS 110B may provide a third message associated with the third event to the back end information handling system via one or more of networks 190A and 190B, among others.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
   a network;
   a management information handling system coupled to the network;
   a first information handling system and a second information handling system, each coupled to the network; and
   a back end information handling system coupled to the network;
   wherein the management information handling system, the first information handling system, the second information handling system, and the back end information handling system each include a respective processor and a respective memory medium coupled to the respective processor of the respective information handling system that stores instructions executable by the respective processor of the respective information handling system;

wherein the instructions stored by the memory medium of the management information handling system, which when executed by the processor of the management information handling system, cause the management information handling system to:
receive, via the network, a plurality of discovery messages from the first information handling system and the second information handling system; and
update an inventory based at least on the plurality of discovery messages;

wherein the instructions stored by the memory medium of the first information handling system, which when executed by the processor of the first information handling system, cause the first information handling system to:
determine a first alert associated with a first hardware event;

wherein the instructions stored by the memory medium of the management information handling system further cause the management information handling system to:
receive, via the network, a first message associated with the first hardware event from the first information handling system;
determine, based at least on the first message, that each of a plurality of rules is not associated with the first hardware event;
in response to determining that each of the plurality of rules is not associated with the first hardware event, provide a second message associated with the first hardware event to the back end information handling system;

wherein the instructions stored by the memory medium of the back end information handling system cause the back end information handling system to:
receive, from the management information handling system, the second message;
determining, based on the second message, data indicating how to handle the first hardware event;

wherein the instructions stored by the memory medium of the management information handling system further cause the management information handling system to:
receive, from the back end information handling system, the data indicating how to handle the first hardware event;
add, to the plurality of rules, a rule based at least on the data indicating how to handle the first hardware event; and
provide the rule to the second information handling system; and wherein the instructions stored by the memory medium of the second information handling system, which when executed by the processor of the second information handling system, cause the second information handling system to:
determine a second alert associated with a second hardware event;
determine, independent of the management information handling system, that the second hardware event matches the rule that was provided to the second information handling system; and
handle the second hardware event based at least on the rule, without assistance from the management information handling system.

2. The system of claim 1,
wherein the instructions stored by the memory medium of the back end information handling system, which when executed by the processor of the back end information handling system, cause the back end information handling system to:
in response to receiving the second message associated with the first hardware event, raise a case associated with the first hardware event.

3. The system of claim 1, wherein the first alert is associated with a failure of a component of the first information handling system.

4. The system of claim 3, wherein the component includes a power supply, a fan, or a non-volatile memory medium.

5. The system of claim 1, wherein the instructions stored by the memory medium of the second information handling system further cause the second information handling system to:
determine that a third hardware event does not match the rule; and
provide a third message associated with the third hardware event to the back end information handling system.

6. The system of claim 1, wherein to add, to the plurality of rules, the rule based at least on the data indicating how to handle the first hardware event, the instructions stored by the memory medium of the management information handling system further cause the management information handling system to update a rules engine.

7. The system of claim 1, wherein the first information handling system and the second information handling system are a managed compute nodes.

8. A method, comprising:
receiving, via a network and by a management information handling system, a plurality of discovery messages from a first information handling system and a second information handling system, the management information handling system, the first information handling system, and the second information handling system each including a respective processor and a respective memory medium coupled to the respective processor of the respective information handling system that stores instructions executable by the respective processor of the respective information handling system;
updating, by the management information handling system, an inventory based at least on the plurality of discovery messages;
determining, by the first information handling system a first alert associated with a first hardware event;
receiving, via the network and by the management information handling system, a first message associated with the first hardware event from the first information handling system;
determining, based at least on the first message and by the management information handling system, that each of a plurality of rules is not associated with the first hardware event;
in response to the determining that each of the plurality of rules is not associated with the first hardware event, providing, by the management information handling system, a second message associated with the first hardware event to a back end information handling system, the back end information handling system including a processor and a memory medium coupled to the processor that stores instructions executable by the processor of the back end information handling system;

receiving, by the back end information handling system, the second message;

determining, by the back end information handling system and based on the second message, data indicating how to handle the first hardware event;

receiving, from the back end information handling system, the data indicating how to handle the first hardware event;

adding, by the management information handling system, to the plurality of rules, a rule based at least on the data indicating how to handle the first hardware event;

providing, by the management information handling system, the rule to the second information handling system;

determining, by the second information handling system, a second alert associated with a second hardware event;

determining, by the second information handling system and independent of the management information handling system, that the second hardware event matches the rule that was provided to the second information handling system; and handling, by the second information handling system, the second hardware event based at least on the rule.

9. The method of claim 8, further comprising:

in response to the receiving the second message associated with the first hardware event, raising, by the back end information handling system, a case associated with the first hardware event.

10. The method of claim 8, wherein the first alert is associated with a failure of a component of the first information handling system.

11. The method of claim 10, wherein the component includes a power supply, a fan, or a non-volatile memory medium.

12. The method of claim 8, further comprising:

determining, by the second information handling system, that a third hardware event does not match the rule; and providing, by the second information handling system, a third message associated with the third hardware event to the back end information handling system.

13. The method of claim 8, wherein the adding, to the plurality of rules, the rule based at least on the data indicating how to handle the first hardware event includes updating a rules engine.

14. The method of claim 8, wherein the first information handling system and the second information handling system are a managed compute nodes.

* * * * *